(12) United States Patent
Grayson et al.

(10) Patent No.: US 8,196,823 B2
(45) Date of Patent: Jun. 12, 2012

(54) OPTICAL LOCK SYSTEMS AND METHODS

(75) Inventors: Benjamin Alan Grayson, Ann Arbor, MI (US); Debasish Benerjee, Ann Arbor, MI (US); Minjuan Zhang, Ann Arbor, MI (US); Yasuo Uehara, Ann Arbor, MI (US); Masahiko Ishii, Okazaki (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/853,718

(22) Filed: Aug. 10, 2010

(65) Prior Publication Data
US 2012/0036905 A1    Feb. 16, 2012

(51) Int. Cl.
*G07B 15/02* (2006.01)
(52) U.S. Cl. .................. 235/384; 235/375; 235/385
(58) Field of Classification Search .................. 235/375, 235/384, 435
See application file for complete search history.

(56) References Cited

U.S. PATENT DOCUMENTS

| | | | |
|---|---|---|---|
| 3,247,392 A | 4/1966 | Thelen | |
| 3,769,515 A | 10/1973 | Clark, Jr. | |
| 3,885,408 A | 5/1975 | Clark, Jr. | |
| 3,910,681 A | 10/1975 | Elliott et al. | |
| 4,079,605 A | 3/1978 | Bartels | |
| 4,449,126 A | 5/1984 | Pekker | |
| 4,525,028 A | 6/1985 | Dorschner | |
| 4,556,599 A | 12/1985 | Sato et al. | |
| 4,643,518 A | 2/1987 | Taniguchi | |
| 4,673,914 A | 6/1987 | Lee | |
| 4,714,308 A | 12/1987 | Sawamura et al. | |
| 4,868,559 A | 9/1989 | Pinnow | |
| 5,007,710 A | 4/1991 | Nakajima et al. | |
| 5,043,593 A * | 8/1991 | Tsutsumi et al. | ............ 307/10.2 |
| 5,132,661 A * | 7/1992 | Pinnow | ........................ 340/5.28 |

(Continued)

FOREIGN PATENT DOCUMENTS

JP    2000329933 A    11/2000

(Continued)

OTHER PUBLICATIONS

Laser 2000 Gmbttp://www.laser2000.de/fileadmin/Produkdaten/SK_WEB/Datenblaetter_SEM/SEMROCK-StopLine-Notchfilter.pdf, accessed Feb. 2, 2010.

(Continued)

*Primary Examiner* — Ali Sharifzada
(74) *Attorney, Agent, or Firm* — Dinsmore & Shohl LLP (57) ABSTRACT

In one embodiment, the optical lock system may include an electronic control unit, a lock housing including a lock chamber, and an optical key including a multilayer photonic structure. The multilayer photonic structure may produce a unique intensity profile and includes a plurality of coating layers of high index dielectric material and a plurality of coating layers of low index dielectric. A light source may transmit a reference light to the multilayer photonic structure when the optical key is disposed within the lock chamber. A photo detector may receive an interaction light from the multilayer photonic structure and may transmit the unique intensity profile to the electronic control unit which may execute machine readable instructions to: compare the unique intensity profile to an electronic master; and cause the lock actuator to transition from a first state to a second state when the unique intensity profile corresponds to the electronic master.

18 Claims, 10 Drawing Sheets

U.S. PATENT DOCUMENTS

| | | | |
|---|---|---|---|
| 5,138,468 A | | 8/1992 | Barbanell |
| 5,245,329 A | * | 9/1993 | Gokcebay ............... 340/5.33 |
| 5,279,657 A | | 1/1994 | Phillips et al. |
| 5,283,431 A | | 2/1994 | Rhine |
| 5,323,416 A | | 6/1994 | Bhat et al. |
| 5,491,470 A | * | 2/1996 | Veligdan ................. 340/5.6 |
| 5,543,665 A | * | 8/1996 | Demarco ................. 340/5.6 |
| 5,561,420 A | * | 10/1996 | Kleefeldt et al. .......... 340/5.26 |
| 5,653,792 A | | 8/1997 | Phillips et al. |
| 5,691,844 A | | 11/1997 | Oguchi et al. |
| 5,850,309 A | | 12/1998 | Shirai et al. |
| 5,889,603 A | * | 3/1999 | Roddy et al. ............ 398/168 |
| 6,049,419 A | | 4/2000 | Wheatley et al. |
| 6,055,079 A | | 4/2000 | Hagans et al. |
| 6,130,780 A | | 10/2000 | Joannopoulos et al. |
| 6,156,115 A | | 12/2000 | Pfaff et al. |
| 6,180,025 B1 | | 1/2001 | Schoenfeld et al. |
| 6,387,457 B1 | | 5/2002 | Jiang et al. |
| 6,399,228 B1 | | 6/2002 | Simpson |
| 6,433,931 B1 | | 8/2002 | Fink et al. |
| 6,565,770 B1 | | 5/2003 | Mayer et al. |
| 6,574,383 B1 | | 6/2003 | Erchak et al. |
| 6,618,149 B1 | | 9/2003 | Stirton |
| 6,624,945 B2 | | 9/2003 | Fan et al. |
| 6,667,095 B2 | | 12/2003 | Wheatley et al. |
| 6,873,393 B2 | | 3/2005 | Ma |
| 6,887,526 B1 | | 5/2005 | Arit et al. |
| 6,894,838 B2 | | 5/2005 | Mizrahi et al. |
| 6,903,873 B1 | | 6/2005 | Joannopoulos et al. |
| 6,927,900 B2 | | 8/2005 | Liu et al. |
| 6,997,981 B1 | | 2/2006 | Coombs et al. |
| 7,098,257 B2 | | 8/2006 | Rink et al. |
| 7,123,416 B1 | | 10/2006 | Erdogan et al. |
| 7,141,297 B2 | | 11/2006 | Condo et al. |
| 7,184,133 B2 | | 2/2007 | Coombs et al. |
| 7,190,524 B2 | | 3/2007 | Grawert et al. |
| 7,215,473 B2 | | 5/2007 | Fleming |
| 7,267,386 B2 | | 9/2007 | Hesch |
| 7,367,690 B2 | | 5/2008 | Chen |
| 7,367,691 B2 | | 5/2008 | Lin |
| 7,410,685 B2 | | 8/2008 | Rosenberger et al. |
| 7,446,142 B2 | | 11/2008 | Meisenburg et al. |
| 7,483,212 B2 | | 1/2009 | Cho et al. |
| 7,903,339 B2 | | 3/2011 | Banerjee et al. |
| 2001/0022151 A1 | | 9/2001 | Sliwinski et al. |
| 2002/0129739 A1 | | 9/2002 | Yanagimoto et al. |
| 2003/0059549 A1 | | 3/2003 | Morrow et al. |
| 2004/0047055 A1 | | 3/2004 | Mizrahi et al. |
| 2004/0156984 A1 | | 8/2004 | Vitt et al. |
| 2004/0179267 A1 | | 9/2004 | Moon et al. |
| 2004/0246477 A1 | | 12/2004 | Moon et al. |
| 2004/0263983 A1 | | 12/2004 | Acree |
| 2005/0126441 A1 | | 6/2005 | Skelhorn |
| 2005/0235714 A1 | * | 10/2005 | Lindstrom ................. 70/493 |
| 2006/0030656 A1 | | 2/2006 | Tarng et al. |
| 2006/0081858 A1 | | 4/2006 | Lin et al. |
| 2006/0159922 A1 | | 7/2006 | O'Keefe |
| 2006/0222592 A1 | | 10/2006 | Burda |
| 2007/0221097 A1 | | 9/2007 | Tarng et al. |
| 2009/0046368 A1 | | 2/2009 | Banerjee et al. |
| 2009/0082659 A1 | | 3/2009 | Ham et al. |
| 2009/0153953 A1 | * | 6/2009 | Banerjee et al. ............ 359/359 |
| 2009/0303044 A1 | | 12/2009 | Furuichi et al. |
| 2010/0208338 A1 | | 8/2010 | Banerjee et al. |
| 2010/0209593 A1 | | 8/2010 | Banerjee et al. |

FOREIGN PATENT DOCUMENTS

| | | |
|---|---|---|
| JP | 2005144925 A | 6/2005 |
| WO | WO02054030 | 7/2002 |
| WO | WO03062871 | 3/2003 |

OTHER PUBLICATIONS

International Search Report for PCT/US2010/022378 mailed Mar. 30, 2010.

Hongqiang et al., "Disordered dielectric high reflectors with broadband from visible to infrared," Applied Physics Letters, American Institute of Physics, Melville, NY, US. vol. 74, No. 22, dated May 31, 2009.

Xifre-Perez et al, "Porous silicon mirrors with enlarged omnidirectional band gap," Journal of Applied Physics, American Institute of Physics, Melville, NY, US, vol. 97, No. 6, dated Mar. 9, 2005.

Bendiganavale A.K , Malshe, V.C., "Infrared Reflective Inorganic Pigments", Recent Patents on Chemical Engineering, 2008, 1, 67-79.

D.P. Young, Jr., et al. "Comparison of Avian Responses to UV-Light Reflective Paint on Wind Turbines," National Renewable Energy Laboratory, Subcontract Report, Jan. 2003.

Maier, E.J. "To Deal With the Invisible": On the biological significance of ultraviolet sensitivity in birds. Naturwissenschaften 80: 476-478, 1993.

Nison, J., "Twinkle, Twinkle Little Star," Asia Pacific Coating Journal, Feb. 2004.

Fink, Joel "A Dielectric Omnidirectional Reflector", E.L. Thomas, Science, vol. 282, Nov. 27 (1988).

Lin, Weihua, "Design and Fabrication of Omnidirectional Reflectors in the Visible Range" Journal of Modern Optics, vol. 52, No. 8, 1155 (2005).

Chen, Kevin M. "Si02/Ti02 Omnidirectional Reflector and Microcavity Resonator Via the Sol-Gel Method", Appl. Phys. Lett., vol. 75, No. 24, Dec. 13, 1999.

Almeida, R.M., "Photonic Bandgap Materials and Structures by Sol-Gel Processing", Journal of Non-Crystalline Solids, 405-499 (2003).

Deopura, M., "Dielectric Omnidirectional Visible Reflector," Optics Letters, Aug. 1, 2001, vol. 16, No. 15.

Decorby, R.G., "Planar Omnidirectional Reflectors in Chalcogenide Glass and Polymer" Optics Express, 6228, Aug. 8, 2005.

Clement, T.J., "Improved Omnidirectional Reflectors in Chalcogenide Glass and Polymer by Using the Silver Doping Technique", Optics Express, 14, 1789 (2006).

Bryant, A., "All-Silicon Omnidirectional Mirrors Based on One-Dimensional Crystals", Appl. Phys. Lett. vol. 82, No. 19, May 12, 2003.

Chigrin, D.N., "Observation of Total Omnidirectional Reflection From A One-Dimensional Dielectric Lattice", Appl. Phys. A. 68, 25-28 (1999).

Park, Y., "GaAs-based Near-infrared Omnidirectional Reflector," Appl. Phys. Lett., vol. 82, No. 17, Apr. 28, 2003.

H-Y Lee, "Design and Evaluation of Omnidirectional One-Dimensional Photonic Crystals", Journal of Appl. Phys. vol. 93, No. 2, Jan. 15, 2003.

Banerjee, Debasish, "Narrow-band Omnidirectional Structural Color", SAE World Congress 01-1049 (2008).

U.S. Appl. No. 12/686,861 filed Jan. 13, 2010 entitled "Multilayer Photonic Structures".

U.S. Appl. No. 12/853,801 filed Aug. 10, 2010 entitled "Methods for Identifying Articles of Manufacture".

Laser 2000 GmbH, http://www.laser2000.de/fileadmin/Produktdaten/SK_WEB/Datenblaetter_SEM/SEMROCK-StopLine-Notchfilter.pdf, accessed Feb. 2, 2010.

Office Action mailed Oct. 20, 2011 as it relates to U.S. Appl. No. 12/853,801.

Office Action mailed Jul. 20, 2011 as it relates to U.S. Appl. No. 12/389,221.

Office Action mailed Dec. 27, 2011 as it relates to U.S. Appl. No. 12/389,221.

* cited by examiner

OPTICAL LOCK SYSTEMS AND METHODS

TECHNICAL FIELD

The present specification generally relates to locking mechanisms and, more specifically, optical lock systems utilizing multilayer photonic structures.

BACKGROUND

Mechanical locking apparatuses are commonly used to secure the operation of systems or to prevent access to objects. Locking apparatuses may cooperate with a corresponding key to transition between a locked and an unlocked position. The transition between a locked and an unlocked position, or vice versa, may actuate other mechanisms. For example, a vehicle ignition system often requires a key to be manually inserted into a locking apparatus. If the key corresponds to the locking apparatus, the key may be turned to commence a sequence of events which result in the ignition of an internal combustion engine. In another example, a locking apparatus and a corresponding key are often used to prevent access through a door. When the corresponding key is inserted into the locking apparatus the door may be locked or unlocked by a twisting motion.

However, such locking apparatuses are susceptible to mechanical failure mechanisms that prevent the insertion and/or rotation of a key, e.g. ice, rust or fatigue. Furthermore, mechanical locking apparatuses often require a discrete amount of manual dexterity and coordination to insert and rotate the key. The strength and coordination may prevent users such as those suffering from arthritis from operating the locking apparatus.

Accordingly, multilayer photonic structures which operate as a key in a locking system may be desirable and alternative systems and methods for optical locking utilizing multilayer photonic structures are needed.

SUMMARY

In one embodiment, an optical lock system may include: an electronic control unit including a processor for executing machine readable instructions and an electronic memory; a lock housing including a lock chamber; and an optical key including a multilayer photonic structure. The multilayer photonic structure produces a unique intensity profile and includes a plurality of coating layers of high index dielectric material having an index of refraction nH and a plurality of coating layers of low index dielectric material having an index of refraction nL. A light source may be optically coupled to the lock chamber and communicatively coupled to the electronic control unit. The light source may transmit a reference light to the multilayer photonic structure when the optical key is disposed within the lock chamber. A photo detector may be optically coupled to the lock chamber and communicatively coupled to the electronic control unit. The photo detector may receive an interaction light from the multilayer photonic structure when the optical key is disposed within the lock chamber and may transmit the unique intensity profile of the multilayer photonic structure to the electronic control unit. A lock actuator may be communicatively coupled to the electronic control unit. The electronic control unit may execute the machine readable instructions to: compare the unique intensity profile to an electronic master; and cause the lock actuator to transition from a first state to a second state when the unique intensity profile corresponds to the electronic master.

In another embodiment, an optical lock system may include: a multilayer photonic structure including a plurality of coating layers of high index dielectric material having an index of refraction nH and a plurality of coating layers of low index dielectric material having an index of refraction nL. A light path, including a reference light and an interaction light, may transmit the reference light to the multilayer photonic structure. The reference light may interact with the multilayer photonic structure to produce the interaction light. The interaction light may be received by a photo detector. An electronic control unit, including a processor for executing machine readable instructions and an electronic memory, may be communicatively coupled to the light source and the photo detector. The electronic control unit may execute the machine readable instructions to: receive an intensity profile indicative of the interaction light from the photo detector; quantize a magnitude of the intensity profile at a wavelength; and compare a quantized magnitude to an electronic master stored in the electronic memory.

In yet another embodiment, a method for operating an optical lock may include: transmitting a reference light to a multilayer photonic structure tuned to produce a unique intensity profile, wherein the unique intensity profile is a reflectance profile, a transmittance profile, or a combination thereof. The method may also include: detecting the unique intensity profile; comparing the unique intensity profile to an electronic master; and activating a lock actuator to transition the optical lock from a first state to a second state when the unique intensity profile corresponds to the electronic master.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
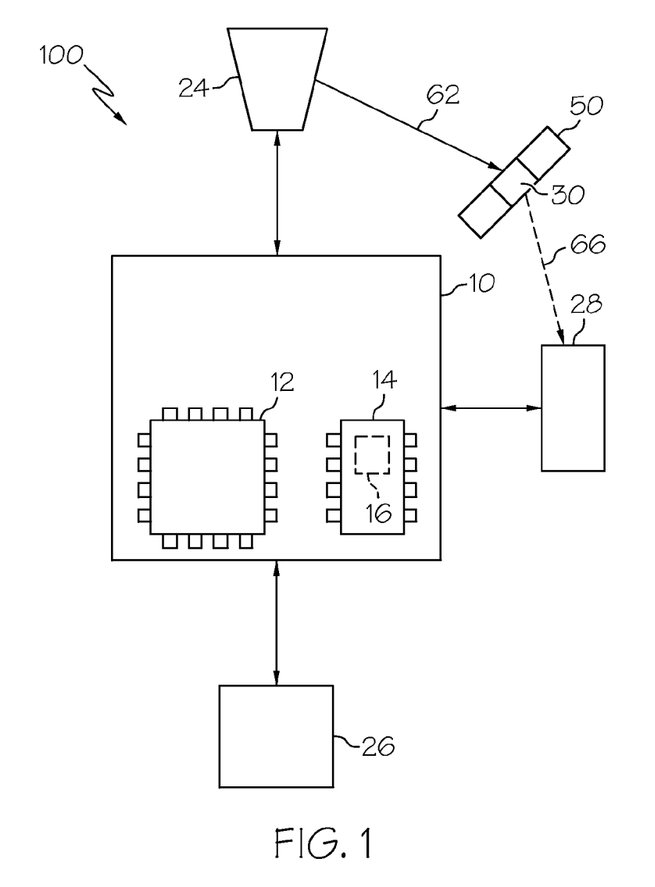
FIG. 1 schematically depicts an optical lock system according to one or more embodiments shown and described herein.

FIG. 1 generally depicts one embodiment of an optical lock system. The optical lock system generally comprises an electronic control unit, an optical key comprising a multilayer photonic structure, a light source that transmits a reference light to the multilayer photonic structure, a photo detector that receives an interaction light from the multilayer photonic structure and a lock actuator that transitions from a first state to a second state. Various embodiments of the optical lock and methods for operating of the optical lock will be described in more detail herein.

In describing the optical lock systems of the present disclosure, reference will be made to light incident on the multilayer photonic structure. The term "light" as used herein refers to various wavelengths of the electromagnetic spectrum, particularly wavelengths in the ultraviolet (UV), infrared (IR), and visible portions of the electromagnetic spectrum.

Referring now to FIG. 1, an optical lock system 100 is schematically depicted. As will be described in more detail herein, embodiments of the optical lock system 100 comprise an electronic control unit 10 communicatively coupled to a light source 24, a lock actuator 26, and a photo detector 28. The embodiments described herein may also comprise an optical key 50 comprising a multilayer photonic structure 30. It is noted that in FIGS. 1 and 4-7E, the double arrowed lines generally indicate that the components are communicatively coupled with one another and single arrowed lines generally indicate that the components are optically coupled to one another. Furthermore, it is noted that the phrases "communicatively coupled," as used herein, means that components are capable of exchanging data signals with one another such as, for example, electrical signals via a conductive medium, electromagnetic signals via air, optical signals via optical waveguides, and the like. The phrase "optically coupled," as used herein, means that components are capable of exchanging light with one another such as, for example, electromagnetic signals via air, optical signals via optical waveguides, and the like.

In one embodiment, the electronic control unit 10 comprises a processor 12 for executing machine readable instructions and an electronic memory 14. The processor 12 may be an integrated circuit, a microchip, a computer or any other computing device capable of reading and executing machine readable instructions. The electronic memory 14 may be RAM, ROM, a flash memory, a hard drive, or any device capable of storing machine readable instructions. In the embodiments described herein, the processor 12 and the electronic memory 14 are integral with the electronic control unit 10. However, it is noted that the electronic control unit 10, the processor 12 and the electronic memory 14 may be discrete components communicatively coupled to one another such as, for example, modules distributed throughout the optical lock system 100 without departing from the scope of the present disclosure. Furthermore, it is noted that the embodiments described herein may comprise multiple processors and/or memories that cooperate to perform the operations of the electronic control unit 10.

Figure 2:
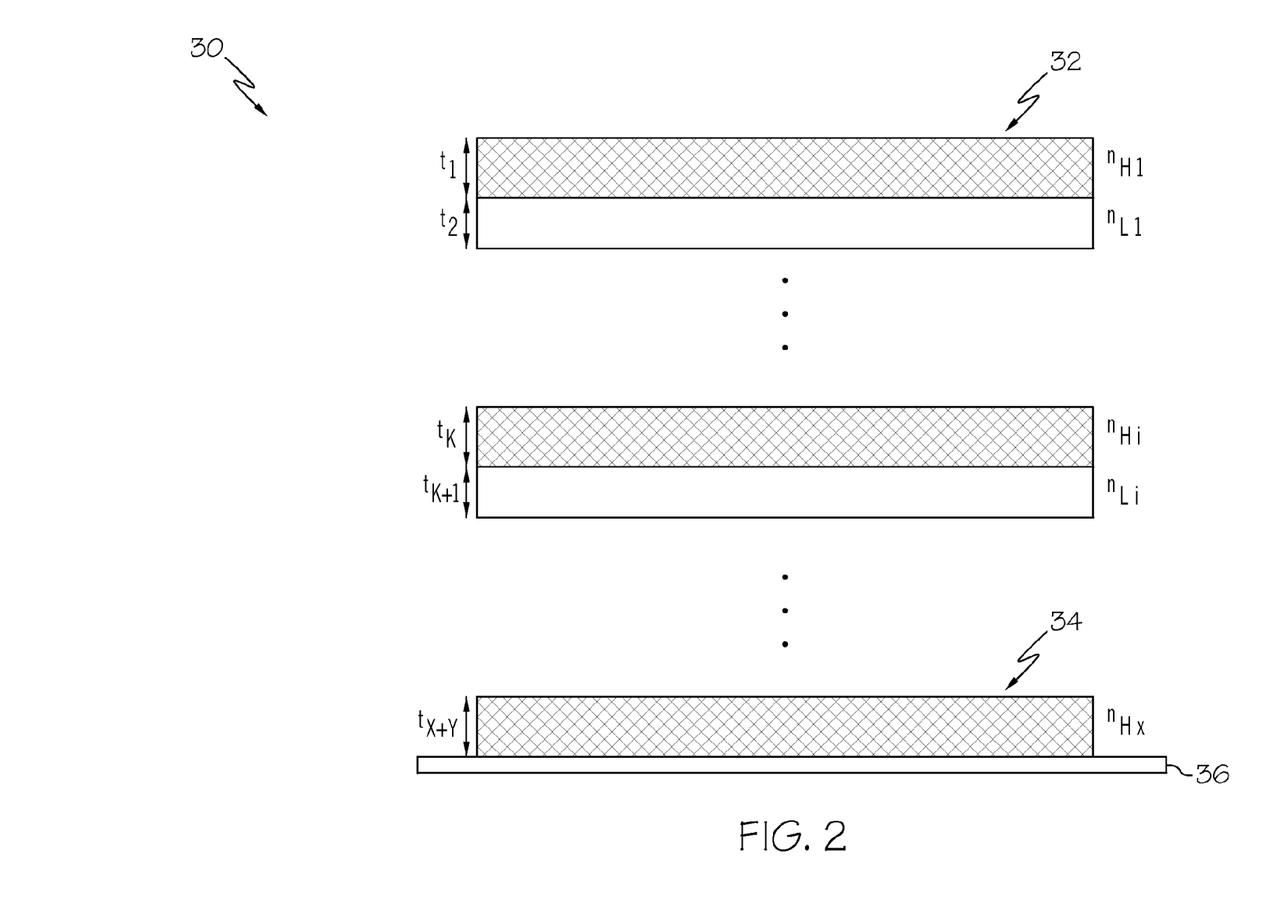
FIG. 2 schematically depicts a multilayer photonic structure according to one or more embodiments shown and described herein.

Still referring to FIG. 1, embodiments of the optical lock system 100 comprise an optical key 50 including a multilayer photonic structure 30. As schematically depicted in FIG. 2, the multilayer photonic structures 30 described herein generally comprise a plurality of coating layers of material with a relatively high refractive index (e.g., high index material $n_H$) and layers of material with a relatively low refractive index (e.g., low index material $n_L$) alternately arranged. Specifically, the high index material $n_H$ has a relatively high refractive index compared to the low index material $n_L$, and the low index material $n_L$ has a relatively low refractive index compared to the high index material $n_H$. In one embodiment, the index of refraction for the high index material $n_H$ is from about 1.9 to about 2.3. In another embodiment, the index of refraction for the low index material $n_L$ is from about 1.4 to about 1.6.

As shown in FIG. 2, the high index material $n_H$ is generally indicated by an $n_H$ followed by a subscript indicative of a high index layer number (e.g., $n_{H1}$). Similarly, low index material $n_L$ is generally indicated by an $n_L$ followed by a subscript indicative of a low index layer number (e.g., $n_{L1}$). The first layer 32 of the multilayer photonic structure 30 is the layer furthest away from the substrate 36 and comprises a high index material $n_{H1}$. The last layer 34 of the multilayer photonic structure 30 is the layer nearest to the substrate 36 and comprises a high index material $n_{Hx}$. The ellipses indicate that the intermediate layers $n_{Hi}$, $n_{Li}$ may be repeated to achieve any total number of layers x+y, where x is the total number of layers with high index material $n_H$ and y is the total number of layers with low index material $n_L$. As depicted, embodiments of the multilayer photonic structure 30 comprise one more layer of high index material $n_H$ than low index material $n_L$, i.e., x=y+1. Thus, the total number of layers may be any odd number that can be produced by a layer synthesis process such as, for example, from about 9 to about 39, from about 5 to about 99, or from about 3 to an odd number in the hundreds. In one embodiment described herein, the thickness of each layer may be varied to yield a multilayer photonic structure 30 with a unique intensity profile. Accordingly, it should be understood that each layer of the structure may have a thickness which is independent of the thickness of any other layer in the structure. As depicted in FIG. 2, the thickness of each layer is generally indicated by $t_j$ where subscript j is indicative of a layer with a distinct thickness. The subscript j ranges from 1 to x+y, and $t_k$ and $t_{k+1}$ are the thicknesses of intermediate layers. The layers of the multilayer photonic structure 30 are deposited on a substrate 36, which may include glass, polymeric materials, ceramic materials, metallic materials, composite materials and/or various combinations thereof. For example, the layers of the multilayer photonic structure 30 may be deposited on a substrate 36 of glass that has a refractive index of about 1.52.

Figure 3A:
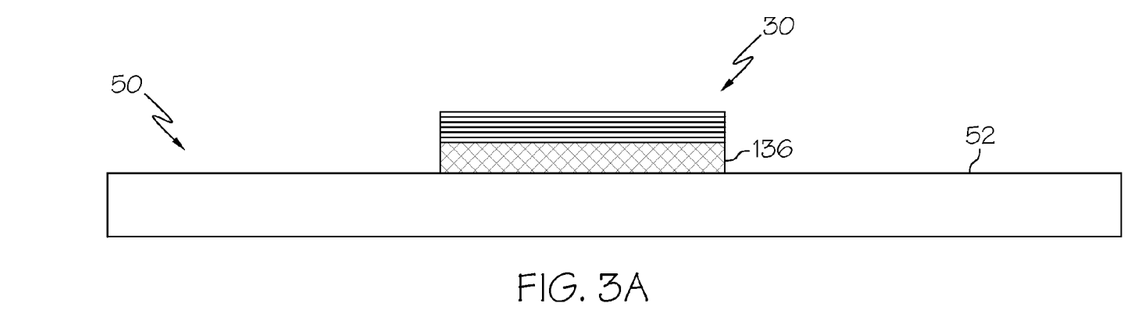
FIG. 3A schematically depicts an optical key according to one or more embodiments shown and described herein.
Figure 3B:
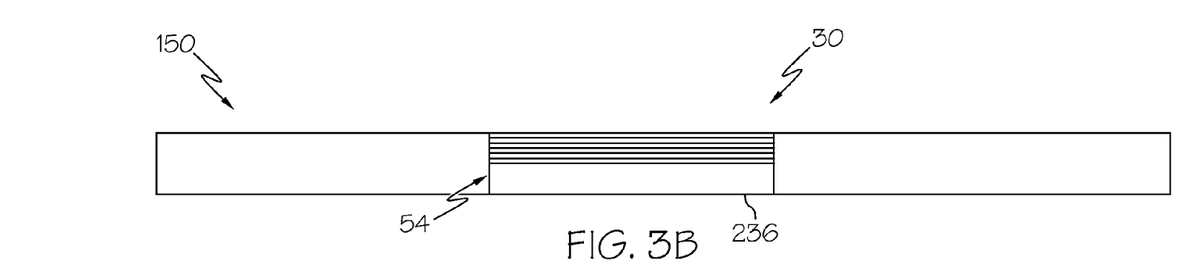
FIG. 3B schematically depicts an optical key according to one or more embodiments shown and described herein.
Figure 3C:
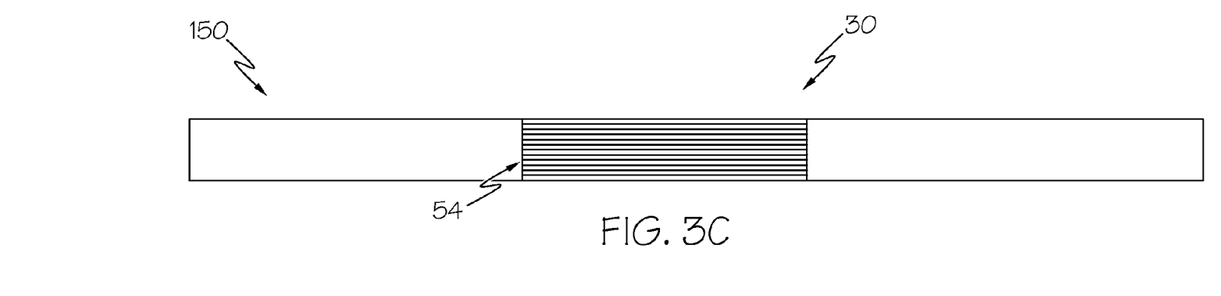
FIG. 3C schematically depicts an optical key according to one or more embodiments shown and described herein.

Referring now to FIG. 3A, in one embodiment the optical key 50 comprises a mounting surface 52. The multilayer photonic structure 30 may be mounted on an opaque substrate 136 which is coupled to the mounting surface 52 of the optical key 50. In another embodiment, schematically depicted in FIG. 3B, the optical key 150 comprises a mounting aperture 54 that passes through the optical key 150. The multilayer photonic structure 30 may be mounted on a transparent substrate 236. The multilayer photonic structure 30 and/or the transparent substrate 236 are coupled to the optical key 150. In a further embodiment, schematically depicted in FIG. 3C, the optical key 150 comprises a mounting aperture 54 that passes through the optical key 150. The multilayer photonic structure 30 may be disposed within the mounting aperture 54 and coupled to the optical key 150 after the substrate is removed from the multilayer photonic structure 30. For example, the substrate 36 may be pealed from the multilayer photonic structure 30, such as when the substrate 36 is a flexible, polymeric substrate, flexible alloy, or the like. Alternatively, the substrate 36 may be dissolved in a suitable solution thereby leaving behind the multilayer photonic structure 30. In yet another embodiment, the multilayer photonic structure 30 may also be pealed from the substrate 36.

It is noted that while specific embodiments of the optical key have been described herein, any permutation of an optical key comprising a multilayer photonic structure 30, a mounting surface 52, a mounting aperture 54, an opaque substrate 136 and/or a transparent substrate 236 may be utilized without departing from the present disclosure. Additionally, as used herein, the term "opaque" means a material that is substantially impenetrable to light, and the term "transparent" means a material that transmits substantially all of the light incident upon the material.

Referring again to FIG. 2, embodiments of the multilayer photonic structure 30 may be tuned to produce an intensity profile, i.e. the multilayer photonic structure 30 may produce a desired intensity profile that has at least one distinguishing characteristic. Specifically, the multilayer photonic structure 30 may be tuned by adjusting the thickness $t_1, t_2, \ldots, t_k, t_{k+1}, \ldots, t_{x+y}$ of each of the layers. The thickness may be any value such as, for example, from about 0.05 nm to about 500 nm. For example, in one embodiment, the multilayer photonic structures 30 are tuned to a unique intensity profile utilizing the methods described in U.S. patent application Ser. No. 12/389,256, titled "Methods For Producing Omni-Directional Multi-Layer Photonic Structures," filed on Feb. 19, 2009, which is incorporated by reference herein.

For example, a transfer matrix method may be employed to solve a system of equations that model the intensity profile of a multilayer photonic structure 30. In one embodiment, the intensity profile is dependent on: the angle of light incident on the structure (e.g., the angle of incidence), the degree of light polarization, the wavelength(s) of interest, the thicknesses $t_j$ of each layer of the multilayer photonic structure 30 and the indices of refraction of the high and low index materials, the transmission medium, and the incidence medium. The transfer matrix method may be implemented with a computer comprising software programmed to receive various inputs from a user related to the properties of a particular multilayer photonic structure 30 and determine an intensity profile. Such software may be referred to as a photonics calculator.

The thickness $t_1, t_2, \ldots, t_k, t_{k+1}, \ldots, t_{x+y}$ of each of the layers may be determined by comparing an intensity profile calculated by the photonics calculator with a desired intensity profile. Specifically, an optimization or curve fitting process may operate in conjunction with the photonics calculator. In one embodiment, the sum of the squared difference between the intensity profile calculated by the photonics calculator and desired intensity profile is minimized. The least squares fitting may be performed by an optimizer implemented with computer software executed on a computer system. While particular methods of modeling and optimizing a multilayer photonic structure 30 are described herein, it should be understood that the embodiments described herein may be modeled and optimized by any method capable of tuning a multilayer photonic structure 30 to produce a desired intensity profile.

The multilayer photonic structure 30 may also be tuned by selecting the appropriate high index material $n_H$ and low index material $n_L$. In one embodiment, the values for $n_L$ and $n_H$ are selected such that the values are the same as commonly available materials. For example, the value of $n_L$ may be selected to be 1.46 while the value for $n_H$ may be selected to be 2.29 such that the values of $n_L$ and $n_H$ approximate the indices of refraction for silica ($SiO_2$, index of refraction 1.46) and titania ($TiO_2$, index of refraction 2.36), respectively. Accordingly, a multi-layer photonic structure design which utilizes 1.46 and 2.29 for $n_L$ and $n_H$, respectively, may be constructed from silica and titania or other materials having the same or similar indices of refraction. It should be understood that other values for $n_L$ and $n_H$ may be selected which correspond to the indices of refraction of other materials. Table 1, shown below, contains a non-exclusive list of possible materials and their corresponding indices of refraction which may be utilized in the multi-layer photonic structures described herein.

TABLE 1

| Material | Index of Refraction (visible spectrum) | Material | Index of Refraction (visible spectrum) |
|---|---|---|---|
| Germanium (Ge) | 4.0-5.0 | Chromium (Cr) | 3.0 |
| Tellurium (Te) | 4.6 | Tin Sulfide (SnS) | 2.6 |
| Gallium Antimonite (GaSb) | 4.5-5.0 | Low Porous Si | 2.56 |
| Indium Arsenide (InAs) | 4.0 | Chalcogenide glass | 2.6 |
| Silicon (Si) | 3.7 | Cerium Oxide ($CeO_2$) | 2.53 |
| Indium Phosphate (InP) | 3.5 | Tungsten (W) | 2.5 |
| Gallium Arsenate (GaAs) | 3.53 | Gallium Nitride (GaN) | 2.5 |
| Gallium Phosphate (GaP) | 3.31 | Manganese (Mn) | 2.5 |
| Vanadium (V) | 3 | Niobium Oxie ($Nb_2O_3$) | 2.4 |
| Arsenic Selenide ($As_2Se_3$) | 2.8 | Zinc Telluride (ZnTe) | 3.0 |
| $CuAlSe_2$ | 2.75 | Chalcogenide glass + Ag | 3.0 |
| Zinc Selenide (ZnSe) | 2.5-2.6 | Zinc Sulfate (ZnSe) | 2.5-3.0 |
| Titanium Dioxide ($TiO_2$) - solgel | 2.36 | Titanium Dioxide- ($TiO_2$) vacuum deposited | 2.43 |
| Alumina Oxide (Al2O3) | 1.75 | Sodium Aluminum Fluoride (Na3AlF6) | 1.6 |
| Yttrium Oxide (Y2O3) | 1.75 | Polyether Sulfone (PES) | 1.55 |
| Polystyrene | 1.6 | High Porous Si | 1.5 |
| Magnesium Fluoride (MgF2) | 1.37 | Indium Tin Oxide nanorods (ITO) | 1.46 |
| Lead Fluoride (PbF2) | 1.6 | Lithium Fluoride (LiF4) | 1.45 |
| Potassium Fluoride (KF) | 1.5 | Calcium Fluoride | 1.43 |
| Polyethylene (PE) | 1.5 | Strontium Fluoride (SrF2) | 1.43 |
| Barium Fluoride (BaF2) | 1.5 | Lithium Fluoride (LiF) | 1.39 |
| Silica (SiO2) | 1.5 | PKFE | 1.6 |
| PMMA | 1.5 | Sodium Fluoride (NaF) | 1.3 |
| Aluminum Arsenate (AlAs) | 1.56 | Nano-porous Silica (SiO2) | 1.23 |
| Solgel Silica (SiO2) | 1.47 | Sputtered Silica (SiO2) | 1.47 |
| N,N' bis(1naphthyl)-4,4'Diamine (NPB) | 1.7 | Vacuum Deposited Silica (SiO2) | 1.46 |
| Polyamide-imide (PEI) | 1.6 | Hafnium Oxide | 1.9-2.0 |
| Fluorcarbon (FEP) | 1.34 | Polytetrafluoro-Ethylene (TFE) | 1.35 |
| Chlorotrifiuoro-Ethylene (CTFE) | 1.42 | Cellulose Propionate | 1.46 |
| Cellulose Acetate Butyrate | 1.46-1.49 | Cellulose Acetate | 1.46-1.50 |

TABLE 1-continued

| Material | Index of Refraction (visible spectrum) | Material | Index of Refraction (visible spectrum) |
|---|---|---|---|
| Methylpentene Polymer | 1.485 | Ethyl Cellulose | 1.47 |
| Acetal Homopolymer | 1.48 | Acrylics | 1.49 |
| Cellulose Nitrate | 1.49-1.51 | Polypropylene (Unmodified) | 1.49 |
| Polyallomer | 1.492 | Polybutylene | 1.50 |
| Ionomers | 1.51 | Polyethylene (Low Density) | 1.51 |
| Nylons (PA) Type II | 1.52 | Acrylics Multipolymer | 1.52 |
| Polyethylene (Medium Density) | 1.52 | Styrene Butadiene Thermoplastic | 1.52-1.55 |
| PVC (Rigid) | 1.52-1.55 | Nylons (Polyamide) Type 6/6 | 1.53 |
| Urea Formaldehyde | 1.54-1.58 | Polyethylene (High Density) | 1.54 |
| Styrene Acrylonitrile Copolymer | 1.56-1.57 | Polystyrene (Heat & Chemical) | 1.57-1.60 |
| Polycarbornate (Unfilled) | 1.586 | Polystyrene (General Purpose) | 1.59 |
| Polysulfone | 1.633 | | |

For example, the multilayer photonic structure 30 may be tuned by selecting a high index material $n_H$, a low index material $n_L$, and a desired intensity profile. In one embodiment, an initial solution of the thickness $t_1, t_2, \ldots, t_k, t_{k+1}, \ldots, t_{x+y}$ of each of the layers is set to a quarter wavelength of the of the wavelength of a peak (or maxima) of the desired intensity profile. Beginning with the initial solution, the optimizer iteratively compares the output intensity profile from the photonics calculator to the desired intensity profile. Based on such a comparison, the optimizer supplies a subsequent solution that is used by the photonics calculator to produce a subsequent output intensity profile. The solving and comparison steps are repeated until the output intensity profile converges upon the desired intensity profile. Another embodiment may utilize a random number generator to generate the initial solution. A further embodiment may provide a different initial solution for different subsets of the layer. For example, an intensity profile may comprise three maxima at three different wavelengths. The multilayer photonic structure 30 may then be divided into three sections such that the layers of each section have an initial solution thickness based on the quarter wavelength of one of the maxima, i.e. the layers of section one start with an initial solution thickness corresponding to one maxima, the layers of section two start with an initial solution thickness corresponding to another maxima, and the layers of section three start with an initial solution thickness corresponding to a further maxima.

The intensity profile may be a reflectance profile, a transmittance profile or a combination thereof. Reflectance, as used herein, refers to the fraction or percentage of light incident on the multilayer photonic structure 30 which is reflected by the multilayer photonic structure 30 and may be plotted as a function of the wavelength of light incident on the structure. Transmittance, as used herein, refers to the fraction or percentage of light incident on the multilayer photonic structure 30 which is transmitted or passed through the multilayer photonic structure 30 and may be plotted as a function of the wavelength of light incident on the structure.

While specific embodiments of the methods for identifying an article of manufacture described herein utilize a tuned reflectance and/or transmittance to produce an intensity profile, it should be understood that the methods described herein may, in the alternative, utilize absorptance for producing an intensity profile. Absorptance, as used herein, refers to the fraction or percentage of light incident on the multilayer photonic structure which is neither reflected nor transmitted and may be determined from the reflectance and the transmittance. Therefore, embodiments of the unique intensity profile may comprise a reflectance, a transmittance, an absorptance, or any combination thereof, as will be described in more detail herein.

Referring again to FIG. 1, the embodiments of the optical lock system 100 described herein comprise a light source 24 communicatively coupled to the electronic control unit 10 and transmits a reference light 62 to the multilayer photonic structure 30. The light source 24 may be a broadband source that transmits light in wavelengths across the full spectral width of the multilayer photonic structure 30, or a narrowband source that transmits light in a limited number of wavelengths. Additionally, the light source 24 may be any type of device capable of producing light such as, for example, a light emitting diode, a laser, an incandescent bulb, and the like.

In one embodiment, the optical lock system 100 comprises a photo detector 28 communicatively coupled to the electronic control unit 10. The photo detector 28 can receive an interaction light 64 from the multilayer photonic structure 30 and transmit an intensity profile indicative of the interaction light 64 to the electronic control unit 10. As used herein, the phrase "photo detector" means a device that measures light intensity across a desired spectral bandwidth such as, for example, an optical detector, a light dependent resistor, a photodiode, a phototube and the like.

Still referring to FIG. 1, another embodiment of the optical lock system 100 comprises a lock actuator 26 that transitions from a first state to a second state. The lock actuator 26 is communicatively coupled to the electronic control unit 10 such that the electronic control unit 10 may cause the lock actuator 26 to actuate. In the embodiments described herein, the lock actuator 26 may be any servo-mechanism that supplies and transmits a measured amount of energy for the operation of another mechanism, such as a mechanical linkage, an electromechanical system, an electric motor, a hydraulic mechanism, a pneumatic mechanism, and the like. Therefore, the lock actuator 26 may be coupled to any type of switching device or may comprise a switching device such as, for example, a locking device, a vehicle ignition, an electrical switch, a solid state device, and the like. The switching device may transition from a first state such as, for example, a locked state, an unlocked state, an non-ignited state, an ignited state, off state, on state, conductive state, and non-conductive state, to a second state such as, for example, an unlocked state, a locked state, an ignited state, an non-ignited state, on state, off state, non-conductive state and conductive state.

Figure 4:
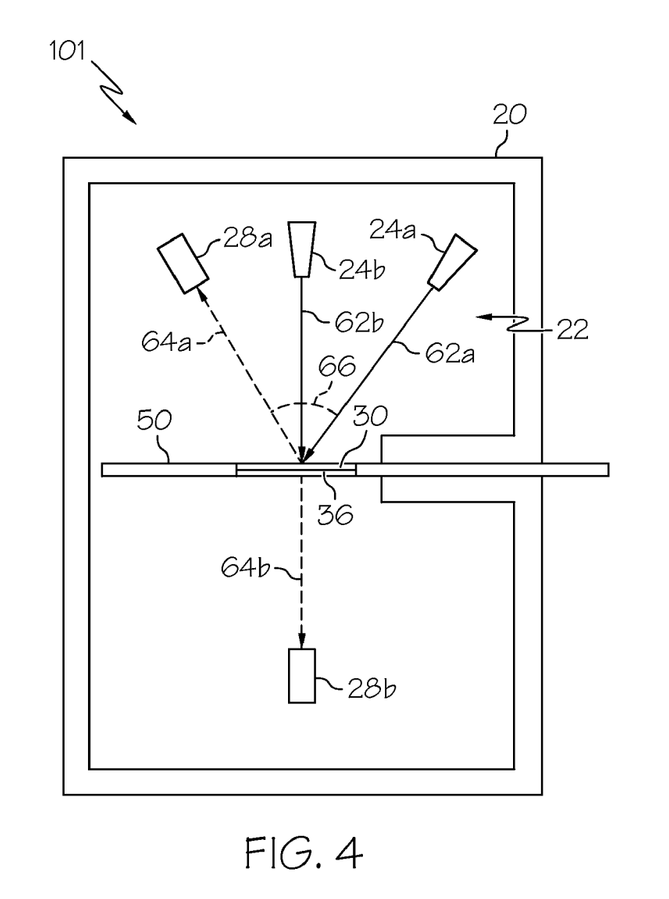
FIG. 4 schematically depicts an optical lock system according to one or more embodiments shown and described herein.

Referring now to FIG. 4, an embodiment of the optical lock system 101 comprises a lock housing 20 including a lock chamber 22. Specifically, the lock housing 20 may be any physical enclosure that surrounds and supports the components of the optical lock system 101. The lock chamber 22 is an optically isolated compartment that shields the components of the optical lock system 101 from optical interference such as from ambient light. In this embodiment, a first light source 24a, a second light source 24b, a first photo detector 28a and a second photo detector 28b are optically coupled to the lock chamber 22. When an optical key 50 comprising a multilayer photonic structure 30 is placed within the lock chamber 22, the first light source 24a transmits a first reference light 62a to the multilayer photonic structure 30. The first reference light 62a interacts with the multilayer photonic structure 30 and a first interaction light 64a is received by the first photo detector 28a. A reflection angle 66, which is indicative of the alignment of the first light source 24a and the first photo detector 28a, is formed between the first reference light 62a and the first interaction light 64a. The second light source 24b transmits a second reference light 62b to the multilayer photonic structure 30 when the optical key 50 is placed within the lock chamber 22. The second reference light 62b interacts with the multilayer photonic structure 30 and a second interaction light 64b is received by the second photo detector 28b. The interaction lights 64a, 64b may then be converted to intensity profiles, such as a reflectance, a transmittance or an absorptance of the multilayer photonic structure 30, as will be described in greater detail herein. Furthermore, it is noted that while FIG. 4 depicts two light sources 24a, 24b and two photo detectors 28a, 28b, the embodiments described herein may have any number of light sources and photo detectors, as described in further detail below.

Figure 5A:
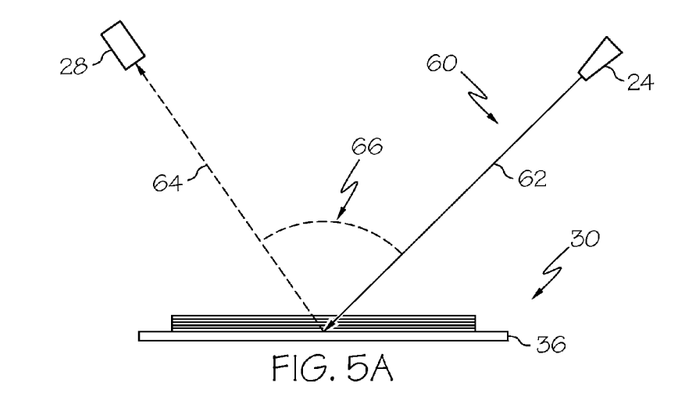
FIG. 5A schematically depicts an arrangement for measuring an intensity profile according to one or more embodiments shown and described herein.
Figure 5B:
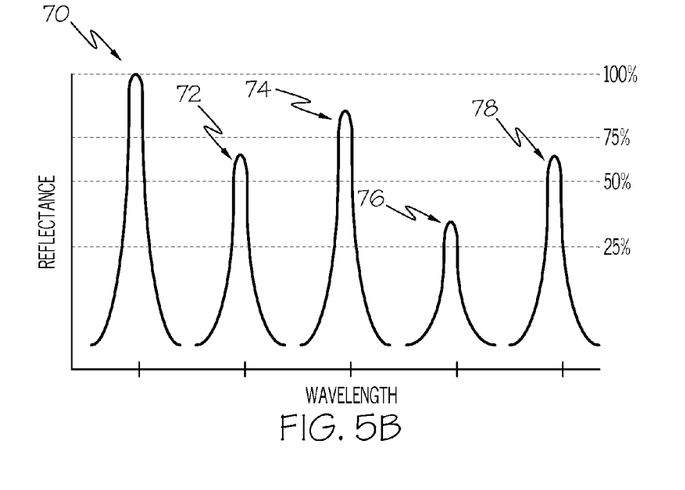
FIG. 5B graphically depicts a reflectance profile according to one or more embodiments shown and described herein.

Referring collectively to FIGS. 5A and 5B, in one embodiment a light source 24 and a photo detector 28 are arranged to measure the intensity profile of the multilayer photonic structure 30 as a reflectance, i.e. the light path 60 is reflected away from the multilayer photonic structure 30 at a reflection angle 66. The interaction light 64 may be converted to an intensity profile by the photo detector 28 and/or the electronic control unit 10 (FIG. 1), i.e. information indicative of the intensity profile and/or information indicative of the interaction light 64 can transmitted from the photo detector 28 to the electronic control unit 10. For example, the reflectance may be plotted as a function of the wavelength of the reference light 62 incident upon the multilayer photonic structure 30. FIG. 5B shows a reflectance profile comprising reflectance peaks 70, 72, 74, 76, 78 at different wavelengths between about 900 nm to about 1600 nm. It is noted that, while five peaks are depicted in FIG. 5B, the number of peaks in an intensity profile is unlimited. It is noted that the phrase "light path," as used herein, means the propagation direction of light that is optically communicated between components that are optically coupled, e.g. a light source 24 and a photo detector 28.

One practical consideration that may limit the number of permissible peaks within an intensity profile is the desired full width at half maximum (FWHM). The FWHM is the wavelength interval over which the magnitude of the intensity profile is equal to or greater than one half of the magnitude of the maximum intensity. The number of intensity profile peaks is inversely related to the FWHM, i.e. for larger FWHM the number of peaks will be decreased and for smaller FWHM the number of peaks will be increased. For example, in an embodiment with a FWHM of about 100 nm, depicted in FIG. 5B, the first reflectance peak 70 is centered at about 950 nm, the second reflectance peak 72 is centered at about 1100 nm, the third reflectance peak 74 is centered at about 1250 nm, the fourth reflectance peak 76 is centered at about 1400 nm, and the fifth reflectance peak 78 is centered at about 1550 nm. Furthermore, it is noted that the number of peaks may be increased by increasing the spectral bandwidth of the intensity profile, such as, for example, to between about 400 nm and about 2100 nm.

In one embodiment, the intensity profile may be digitized to a collection of digits corresponding to a discrete sampling of the peaks of the intensity profile. For example, referring to FIG. 5B, the digitization may be a five-digit alphanumeric code with a digit that corresponds to each of the reflectance peaks 70, 72, 74, 76, 78 of a reflectance profile. As used herein, the term "alphanumeric" means characters including letters, numbers, punctuation marks, machine readable codes or symbols, and the like.

In further embodiments, the alphanumeric digits may be based on a quantization of one of the reflectance peaks 70, 72, 74, 76, 78 of a reflectance profile. For example, four threshold levels of 25% reflectance, 50% reflectance, 75% reflectance, and 100% reflectance are depicted in FIG. 5B. The reflectance profile may be quantized through a threshold operation where a reflectance value is converted to a digit based on the largest threshold level the portion of the reflectance profile overcomes. Therefore, in one embodiment, the first reflectance peak 70 corresponds to 100%, the second reflectance peak 72 corresponds to 50%, the third reflectance peak 74 corresponds to 75%, the fourth reflectance peak 76 corresponds to 25%, and the fifth reflectance peak 78 corresponds to 50%. The quantized values may then be converted into an alphanumeric code such as "42312." While the present example describes converting the quantized values to numerals, it is noted that the quantized values may be digitized in any manner described herein to generate an electronic code. As described hereinabove, the reflectance profile may have any number of peaks. Furthermore, it is noted that the electronic code may comprise any number of digits sampled from any number of wavelengths. As a result, in some embodiments, the number of digits in the electronic code is independent of the number of peaks of the reflectance profile.

Figure 6A:
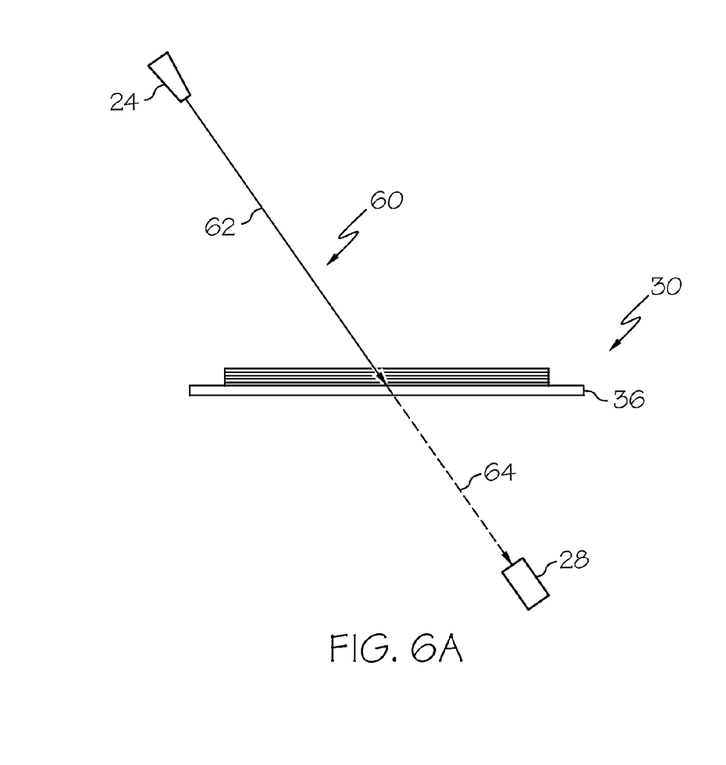
FIG. 6A schematically depicts an arrangement for measuring an intensity profile according to one or more embodiments shown and described herein.
Figure 6B:
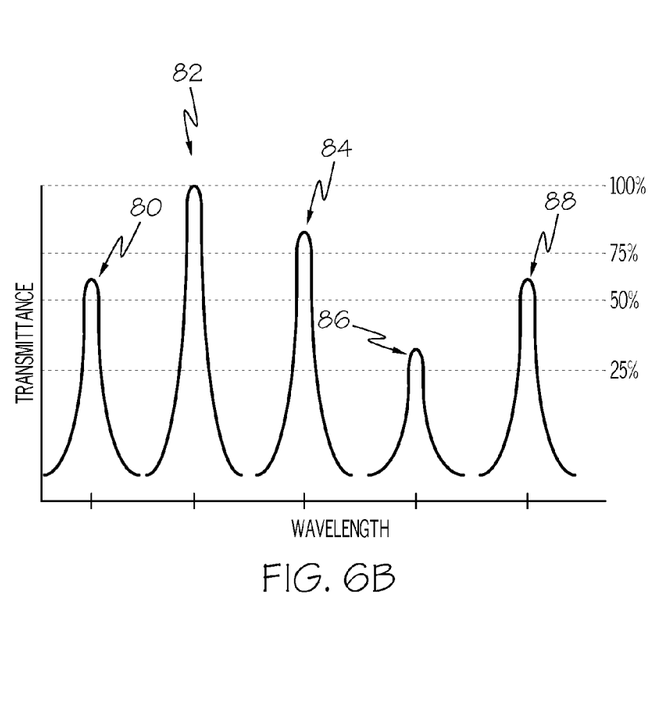
FIG. 6B graphically depicts a transmittance profile according to one or more embodiments shown and described herein.

In another embodiment, as schematically depicted in FIGS. 6A and 6B, a light source 24 and a photo detector 28 are arranged to measure the intensity profile of the multilayer photonic structure 30 as a transmittance, i.e., the light path 60 passes through the multilayer photonic structure 30. The intensity profile, in this case a transmittance, may be plotted as a function of the wavelength of the reference light 62 incident upon the multilayer photonic structure 30. FIG. 6B shows a transmittance profile comprising transmittance peaks 80, 82, 84, 86, 88 at different wavelengths between about 900 nm to about 1600 nm. The transmittance peaks 80, 82, 84, 86, 88 may be digitized and quantized as described hereinabove. For example, the transmittance profile may be quantized into an alphanumeric code such as "24312." It is noted that, while four threshold levels are depicted in FIGS. 5B and 6B, any number of threshold levels may be utilized to quantize the intensity profiles.

Figure 7A:
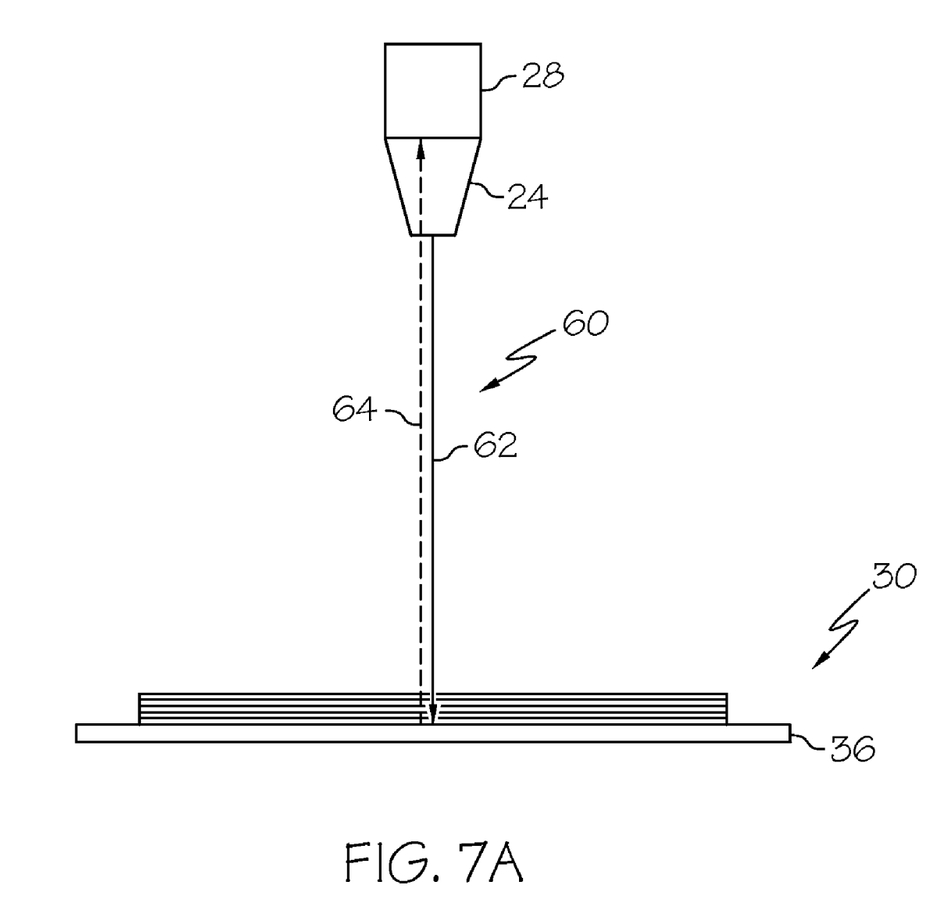
FIG. 7A schematically depicts an arrangement for measuring an intensity profile according to one or more embodiments shown and described herein.
Figure 7B:
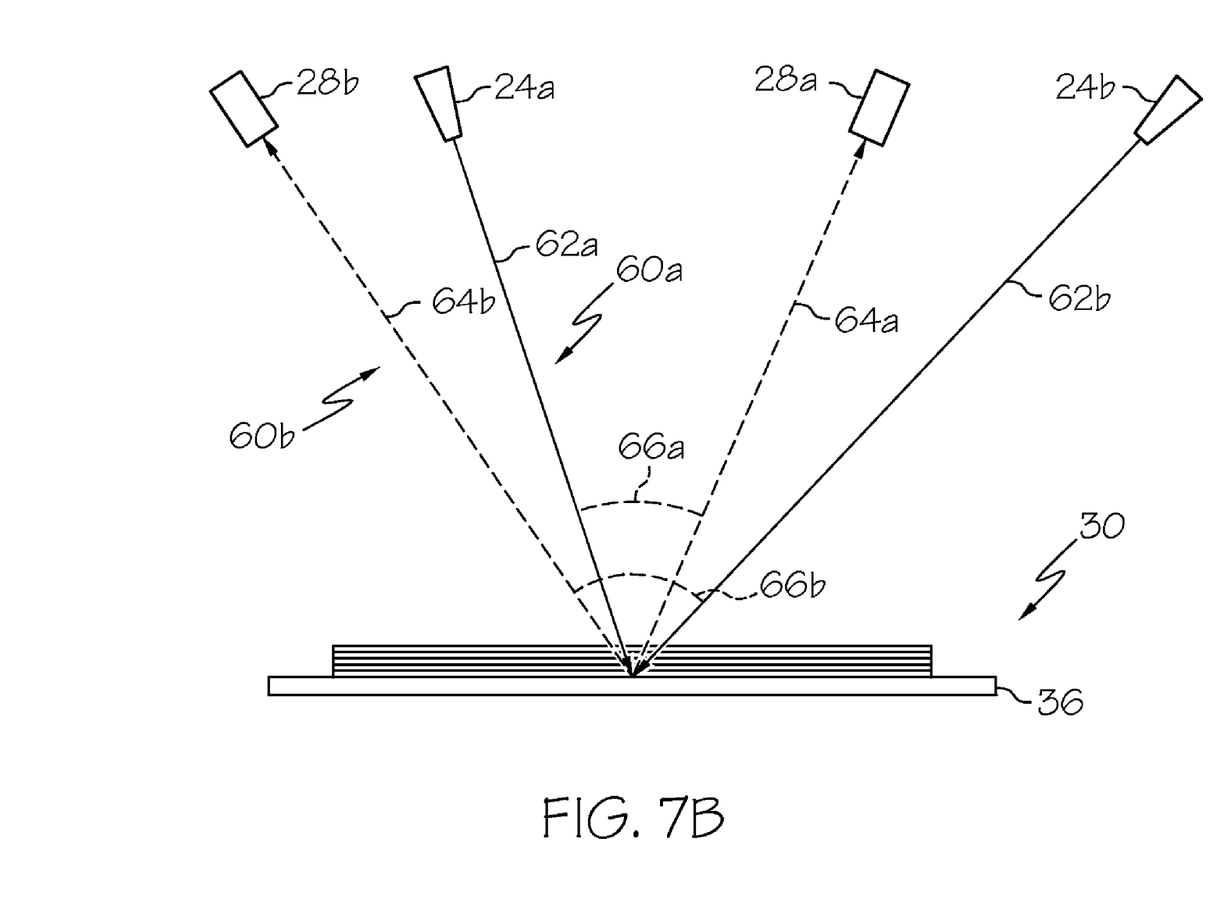
FIG. 7B schematically depicts an arrangement for measuring multiple intensity profiles according to one or more embodiments shown and described herein.
Figure 7C:
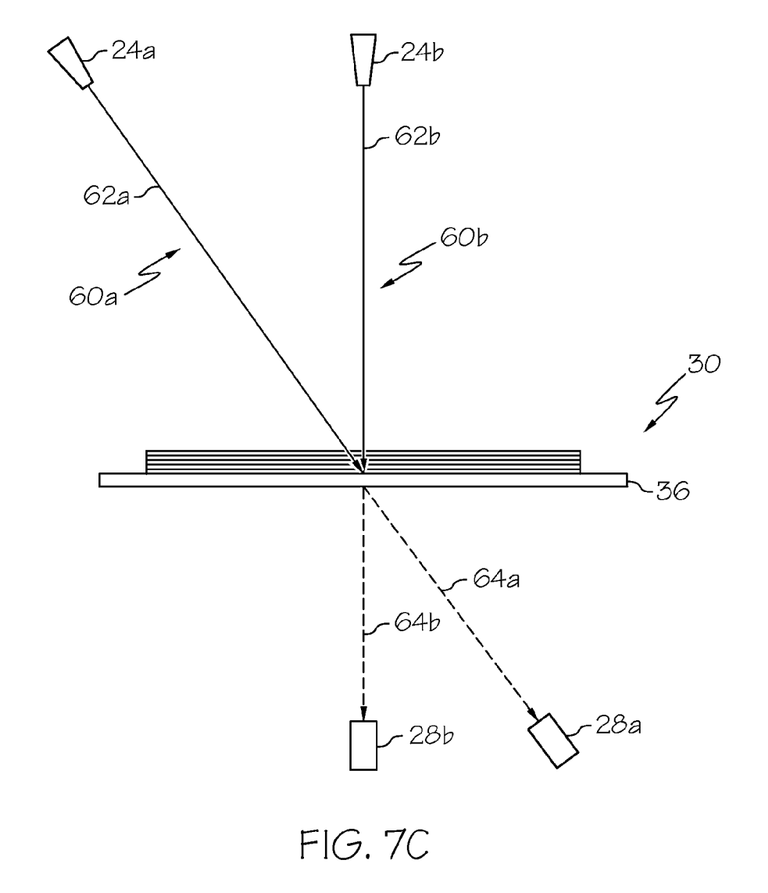
FIG. 7C schematically depicts an arrangement for measuring multiple intensity profiles according to one or more embodiments shown and described herein.
Figure 7D:
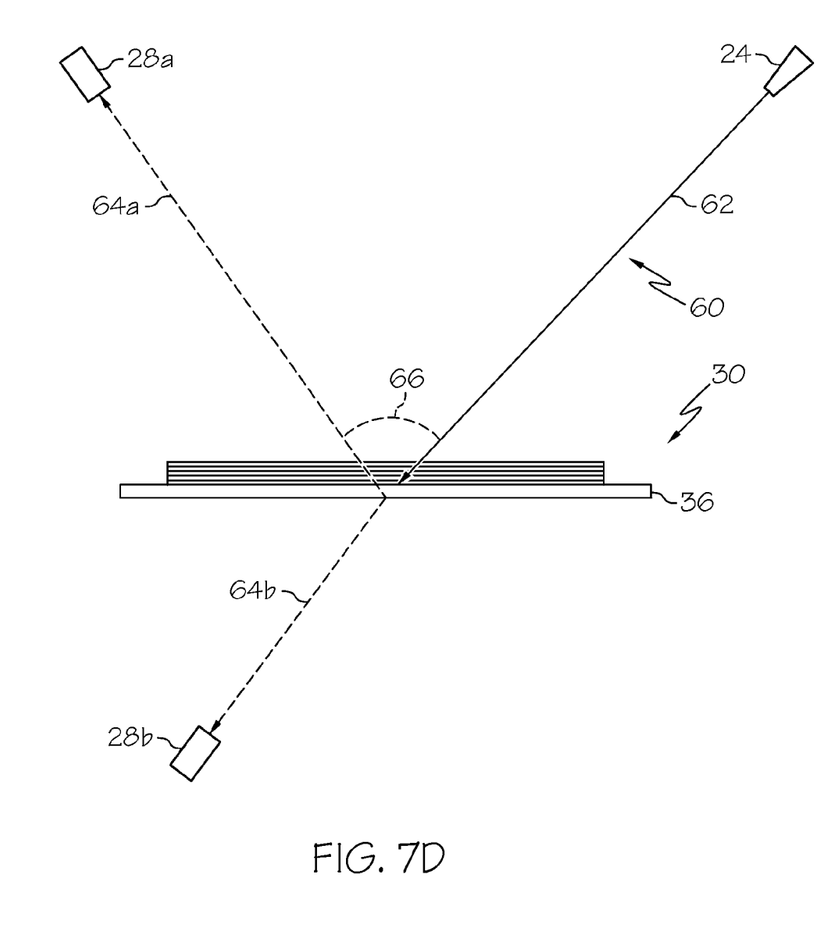
FIG. 7D schematically depicts an arrangement for measuring multiple intensity profiles according to one or more embodiments shown and described herein.

Further embodiments for obtaining an intensity profile comprising one or more reflectances, one or more transmittances, and/or combinations thereof are depicted in FIGS. 7A-7E. In FIGS. 7A, 7B, and 7D, the light source 24 and the photo detector 28 are arranged on the same side of the multilayer photonic structure 30 when configured to measure a reflectance, i.e., the light source 24 and the photo detector 28 oppose the first layer 32 (FIG. 2). It should be noted, however, that in some embodiments the light source 24 and the photo detector 28 may oppose the last layer 34 or substrate 36 of the multilayer photonic structure 30 when measuring a reflectance. Additionally, in FIGS. 7C-7D, the light source 24 and the photo detector 28 may be arranged on the opposite sides of the multilayer photonic structure 30 when configured to measure a transmittance, i.e. the light source 24 opposes the first layer 32 (FIG. 2) and the photo detector 28 opposes the substrate 36. However, in further embodiments (not depicted) the light source 24 may oppose the substrate 36 or the last layer 34 (FIG. 2) and the photo detector 28 may oppose the first layer 32 when measuring a transmittance. The permutations depicted in FIGS. 7A-7E will be described in more detail below.

Referring now to FIG. 7A, in one embodiment, the light source 24 and the photo detector 28 may be arranged to generate and detect an intensity profile along a light path 60 that is substantially monostatic. Specifically, the light source 24 and the photo detector 28 may be adjacent to or integral with one another such that the angle between the reference light 62 and the interaction light 64 is about zero.

In addition to measuring reflectance in a monostatic arrangement, the embodiments described herein may be configured to measure multiple intensity profiles. In one embodiment, depicted in FIG. 7B, multiple reflectances may be measured along a first light path 60a and a second light path 60b. The first light path 60a comprises a first reference light 62a and a first interaction light 64a that form a first reflection angle 66a. The first reference light 62a is transmitted from the first light source 24a to the multilayer photonic structure 30. The first reference light 62a interacts with the multilayer photonic structure 30 and a first interaction light 64a is received by the first photo detector 28a. The second light path 60b comprises a second reference light 62b and a second interaction light 64b that form a second reflection angle 66b. The second reference light 62b is transmitted from the second light source 24b to the multilayer photonic structure 30. The second reference light 62b interacts with the multilayer photonic structure 30 and a second interaction light 64b is received by the second photo detector 28b. The first interaction light 64a and the second interaction light 64b are converted into a first reflectance profile and a second reflectance profile.

In another embodiment, depicted in FIG. 7C, multiple transmittances may be measured along a first light path 60a and a second light path 60b. The first light path 60a is transmitted through the multilayer photonic structure 30 and comprises a first reference light 62a and a first interaction light 64a. The first reference light 62a is transmitted from the first light source 24a to the multilayer photonic structure 30. The first reference light 62a interacts with the multilayer photonic structure 30 and a first interaction light 64a is received by the first photo detector 28a. The second light path 60b is transmitted through the multilayer photonic structure 30 and comprises a second reference light 62b and a second interaction light 64b. The second reference light 62b is transmitted from the second light source 24b to the multilayer photonic structure 30. The second reference light 62b interacts with the multilayer photonic structure 30 and a second interaction light 64b is received by the second photo detector 28b. The first interaction light 64a and the second interaction light 64b are converted into a first transmittance profile and a second transmittance profile. Therefore, as described herein, a multilayer photonic structure 30 may comprise multiple intensity profiles.

In a further embodiment, depicted in FIG. 7D, a light source 24 is utilized to generate multiple intensity profiles. Specifically, the light path 60 comprises a reference light 62 and a first interaction light 64a that forms a reflection angle 66 with the reference light 62, and a second interaction light 64b that is transmitted through the multilayer photonic structure 30. The reference light 62 is transmitted from the light source 24 to the multilayer photonic structure 30. The reference light 62 interacts with the multilayer photonic structure 30. A first interaction light 64a is received by the first photo detector 28a and a second interaction light 64b is received by the second photo detector 28b. The first interaction light 64a and the second interaction light 64b are converted into a reflection profile and a transmittance profile. Therefore, as described herein, a light source 24 may generate multiple intensity profiles.

Referring again to FIG. 1, embodiments of the optical lock system 100 may comprise an electronic master 16 that is compared to the intensity profile of the multilayer photonic structure 30. The electronic master 16 is analog or digital data that is used to determine if the appropriate optical key is being utilized, which is capable of being stored on an electronic memory such as, for example, RAM, ROM, a flash memory, a hard drive, or any device capable of storing machine readable instructions. Therefore, the electronic master 16 may be a substantially continuous profile that mimics a continuous intensity profile or a collection of numerical digits corresponding to a digitization and/or a quantization of the intensity profile. In one embodiment, the electronic master 16 is stored in the electronic memory 14 and compared to the intensity profile. When the electronic master 16 corresponds to the intensity profile, the electronic control unit 10 causes the lock actuator 26 to transition from a first state to a second state (e.g., a locked state and an unlocked state).

It should now be understood that the optical lock systems described herein may be utilized to transition an actuator between multiple states. For example, one embodiment of the system may be utilized to operate an ignition of a vehicle. A lock housing comprising a lock chamber may be installed in the interior of a vehicle and operatively coupled to an engine of the vehicle. When an optical key including a multilayer photonic structure is inserted through an aperture into the lock chamber, an intensity profile is generated by optically coupling a light source with the multilayer photonic structure. The intensity profile is detected by a photo detector and communicated to an electronic control unit. The electronic control unit compares the intensity profile to an electronic master. If the intensity profile matches then the electronic control unit causes a non-ignited engine to ignite through electrical and/or mechanical actuation.

Similarly, when the optical key including a multilayer photonic structure is removed from the lock chamber, no intensity profile will be generated. The lack of an intensity profile is detected by a photo detector and communicated to an electronic control unit. The electronic control unit causes an ignited engine to transition to a non-ignited, i.e., stop running, through electrical and/or mechanical actuation Therefore, the optical properties of the multilayer photonic structure may be utilized in a manner analogous to a key in a vehicle ignition system.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An optical lock system comprising:
    an electronic control unit comprising a processor for executing machine readable instructions and an electronic memory;
    a lock housing comprising a lock chamber;
    an optical key comprising a multilayer photonic structure and a mounting aperture, wherein the multilayer photonic structure produces a unique intensity profile and comprises a plurality of coating layers of high index dielectric material having an index of refraction $n_H$ and a plurality of coating layers of low index dielectric material having an index of refraction $n_L$, and a transparent substrate, wherein a first coating layer is coupled the transparent substrate and the transparent substrate is mounted within the mounting aperture;

a light source optically coupled to the lock chamber and communicatively coupled to the electronic control unit, wherein the light source transmits a reference light to the multilayer photonic structure when the optical key is disposed within the lock chamber;

a photo detector optically coupled to the lock chamber and communicatively coupled to the electronic control unit, wherein the photo detector receives an interaction light from the multilayer photonic structure when the optical key is disposed within the lock chamber and transmits the unique intensity profile of the multilayer photonic structure to the electronic control unit; and a lock actuator communicatively coupled to the electronic control unit, wherein the electronic control unit executes the machine readable instructions to:
compare the unique intensity profile to an electronic master; and
cause the lock actuator to transition from a first state to a second state when the unique intensity profile corresponds to the electronic master.

2. The optical lock system of claim 1 wherein the index of refraction $n_L$ is from about 1.4 to about 1.6.

3. The optical lock system of claim 1 wherein the index of refraction $n_H$ is from about 1.9 to about 2.3.

4. The optical lock system of claim 1 wherein:
the plurality of coating layers of high index material consists of 5 to 20 coating layers of high index material; and
the plurality of coating layers of low index material consists of 4 to 19 coating layers of low index material.

5. The optical lock system of claim 1 wherein the light source opposes the first coating layer of the multilayer photonic structure and the photo detector opposes the transparent substrate of the multilayer photonic structure.

6. The optical lock system of claim 1 wherein the light source emits broadband light.

7. An optical lock system comprising:
a multilayer photonic structure comprising a plurality of coating layers of high index dielectric material having an index of refraction $n_H$ and a plurality of coating layers of low index dielectric material having an index of refraction $n_L$;
a light path comprising a reference light and an interaction light, wherein a light source transmits the reference light to the multilayer photonic structure, the reference light interacts with the multilayer photonic structure to produce the interaction light, and the interaction light is received by a photo detector;
an electronic control unit comprising a processor for executing machine readable instructions and an electronic memory, wherein the electronic control unit is communicatively coupled to the light source and the photo detector, such that the electronic control unit executes the machine readable instructions to:
receive an intensity profile indicative of the interaction light from the photo detector;
quantize a magnitude of the intensity profile at a wavelength; and
compare a quantized magnitude to an electronic master stored in the electronic memory.

8. The optical lock system of claim 7 wherein the light source opposes a first coating layer of the multilayer photonic structure and the photo detector opposes the first coating layer of the multilayer photonic structure.

9. The optical lock system of claim 7 wherein:
the multilayer photonic structure further comprises an opaque substrate, wherein a first coating layer is coupled to the opaque substrate; and
the optical lock system further comprises an optical key comprising a mounting surface, wherein the opaque substrate is mounted on the mounting surface.

10. The optical lock system of claim 7 wherein the index of refraction $n_L$ is from about 1.4 to about 1.6 and the index of refraction $n_H$ is from about 1.9 to about 2.3.

11. The optical lock system of claim 7 wherein the plurality of coating layers of high index dielectric material and the plurality of coating layers of low index dielectric material are alternately arranged and a first coating layer and a last coating layer of the multilayer photonic structure comprise high index dielectric material.

12. The optical lock system of claim 7 wherein the light path passes through the multilayer photonic structure and the intensity profile is a transmittance profile.

13. The optical lock system of claim 7 wherein the light path is reflected by the multilayer photonic structure and the intensity profile is a reflectance profile.

14. The optical lock system of claim 13 wherein a reflection angle is formed between the reference light and the interaction light and the reflection angle is about zero.

15. The optical lock system of claim 7 wherein the electronic control unit executes the machine readable instructions to quantize one or more additional magnitudes of the intensity profile at one or more additional wavelengths.

16. A method for operating an optical lock comprising:
transmitting a reference light to a multilayer photonic structure tuned to produce a unique intensity profile, wherein the unique intensity profile is a reflectance profile, a transmittance profile, or a combination thereof;
detecting the unique intensity profile;
quantizing a magnitude of the unique intensity profile at a wavelength;
comparing the unique intensity profile to an electronic master; and
activating a lock actuator to transition the optical lock from a first state to a second state when the unique intensity profile corresponds to the electronic master.

17. The method of claim 16 further comprising:
transmitting one or more additional reference lights to the multilayer photonic structure, wherein the multilayer photonic structure is tuned to produce one or more additional intensity profiles; and
detecting the one or more additional intensity profiles.

18. The method of claim 16 wherein the optical lock is utilized in a vehicle.

* * * * *